United States Patent [19]

Miyashin et al.

[11] 3,950,499

[45] Apr. 13, 1976

[54] PROCESS FOR PRODUCTION OF CALCIUM HYPOCHLORITE

[75] Inventors: Noboru Miyashin; Masashi Kumoda, both of Johetsu; Makoto Nishonomiya, Nakago; Katsumi Nakayama, Yono; Yasushi Izawa, Myohkohkohgen, all of Japan

[73] Assignee: Nippon Soda Company, Ltd., Tokyo, Japan

[22] Filed: Nov. 15, 1974

[21] Appl. No.: 524,227

[30] Foreign Application Priority Data
Nov. 28, 1973 Japan............................. 48-132586

[52] U.S. Cl................................. 423/474; 423/499
[51] Int. Cl.$^2$...................... C01B 11/06; C01D 3/04
[58] Field of Search............................ 423/474, 499

[56] References Cited
UNITED STATES PATENTS

| | | | |
|---|---|---|---|
| 3,572,989 | 3/1971 | Tatara et al. | 423/474 |
| 3,767,775 | 10/1973 | Tatara et al. | 423/474 |

Primary Examiner—Edward Stern
Attorney, Agent, or Firm—George B. Oujevolk

[57] ABSTRACT

A continuous cyclic process for production of calcium hypochlorite wherein an aqueous solution saturated with calcium hypochlorite and sodium chloride is chlorinated by using chlorine gas to produce sodium chloride crystals and an aqueous chlorinated reaction mixture, the formed sodium chloride crystals being then separated from said aqueous chlorinated reaction mixture. First sodium hydroxide is added to the foregoing aqueous solution which solution also contains calcium hypochlorite and sodium chloride in the crystal phase. Then calcium hydroxide and sodium hydroxide is further added to the aqueous chlorinated reaction mixture remaining after separation of said crystals therefrom. This mixture containing calcium hydroxide and sodium hydroxide is again chlorinated with chlorine gas to produce a slurry containing mainly sodium chloride crystals, calcium hypochlorite crystals and a mother liquor saturated with calcium hypochlorite and sodium chloride. The obtained slurry is divided into a first slurry [I] having mainly calcium hypochlorite crystals, sodium chloride crystals and mother liquor saturated with calcium hypochlorite and sodium chloride, and a second slurry [II] containing calcium hypochlorite crystals with a small amount of sodium chloride crystals and mother liquor saturated with calcium hypochlorite and sodium chloride. The second slurry [II] is then treated so as to remove the calcium hypochlorite crystals with a small amount of sodium chloride crystals thus forming a third phase mother liquor [III] saturated with calcium hypochlorite and sodium chloride. This third phase mother liquor [III] and the first slurry [I] is then recycled to the first step, i.e., the aforesaid aqueous solution with saturated calcium hypochlorite and sodium chloride containing a small amount of calcium hypochlorite crystals and sodium chloride crystals.

10 Claims, No Drawings

PROCESS FOR PRODUCTION OF CALCIUM HYPOCHLORITE

BACKGROUND OF THE INVENTION

The present invention relates to a process for the production of calcium hypochlorite and more particularly to a process in which the sodium choride by-product has high quality and an aqueous solution of calcium hypochlorite is not necessarily found as a by-product.

BRIEF DESCRIPTION OF THE PRIOR ART

For many years calcium hypochlorite has been produced by chlorination of calcium hydroxide and sodium hydroxide with chlorine gas. In the process, a sodium chloride crystal and an aqueous solution of calcium hypochlorite as waste water are by-produced. It is desired that the sodium chloride crystal has a high quality without containing calcium hypochlorite to the extent that it can be employed for the production of sodium hydroxide by electrolysis. For this purpose it is very important to separate sodium chloride crystal from calcium hypochlorite crystal.

As for the aqueous solution of calcium hypochlorite, it can be used as a bleaching agent, however, demand for calcium hypochlorite as a bleaching agent is not so large so that almost the entire amount of the aqueous solution of calcium hypochlorite is thrown away after the treatment requiring control of the pollution of the surroundings and this causes a drop in the yield of calcium hypochlorite. Therefore, there is a need to provide a process in which the formation of an aqueous solution of calcium hypochlorite as a by-product can be controlled and if desired calcium hypochlorite can be produced without any aqueous solution of calcium hypochlorite being produced.

OBJECTS OF THE INVENTION

Accordingly, it is an object of this invention to overcome the aforementioned problems and disadvantages.

It is another object of this invention to provide a process in which sodium chloride crystals grow to large crystals.

It is also an object of this invention to provide a process in which a yield of calcium hypochlorite crystal based on consumed the chlorine gas is high.

It is a further object of this invention to make calcium hypochlorite crystals optionally with or without by-producing an aqueous solution of calcium hypochlorite.

Still another object of this invention is to obtain sodium chloride crystals having high quality.

SUMMARY OF THE INVENTION

Briefly stated, the present invention provides for a continuous cyclic process for production of calcium hypochlorite wherein an aqueous solution saturated with calcium hypochlorite and sodium chloride is chlorinated by using chlorine gas to produce sodium chloride crystals and an aqueous chlorinated reaction mixture, the formed sodium chloride crystals being then separated from said aqueous chlorinated reaction mixture. First sodium hydroxide is added to the foregoing aqueous solution which solution also contains calcium hypochlorite and sodium chloride in the crystal phase. Then calcium hydroxide and sodium hydroxide is further added to the aqueous chlorinated reaction mixture remaining after separation of said crystals therefrom. This mixture containing calcium hydroxide and sodium hydroxide is again chlorinated with chlorine gas to produce a slurry containing mainly sodium chloride crystals, calcium hypochlorite crystals and a mother liquor saturated with calcium hypochlorite and sodium chloride. The obtained slurry is divided into a first slurry [I] having mainly calcium hypochlorite crystals, sodium chloride crystals and mother liquor saturated with calcium hypochlorite and sodium chloride, and a second slurry [II] containing calcium hypochlorite crystals with a small amount of sodium chloride crystals and mother liquor saturated with calcium hypochlorite and sodium chloride. The second slurry [II] is then treated so as to remove the calcium hypochlorite crystals with a small amount of sodium chloride crystals thus forming a third phase mother liquor [III] saturated with calcium hypochlorite and sodium chloride. This third phase mother liquor [III] and the first slurry [I] is then recycled to the first step, i.e., the aforesaid aqueous solution with saturated calcium hypochlorite and sodium chloride containing a small amount of calcium hypochlorite crystals and sodium chloride crystals.

Other objects and advantages of this invention will become further apparent from the following detailed description.

DETAILED DESCRIPTION

Generally speaking, the present invention contemplates the steps of:

a. adding sodium hydroxide into an aqueous solution saturated with calcium hypochlorite and sodium chloride containing a small amount of calcium hypochlorite crystal and sodium chloride crystal;

b. chlorinating the mixture obtained in step (a) with chlorine gas to produce sodium chloride crystals and an aqueous chlorinated reaction mixture;

c. isolating the formed sodium chloride crystals from said aqueous chlorinated reaction mixture;

d. feeding calcium hydroxide and sodium hydroxide into the aqueous chlorinated reaction mixture remaining after separation of said crystals therefrom;

e. chlorinating the mixture obtained in step (d) containing calcium hydroxide and sodium hydroxide with chlorine gas to produce slurry containing mainly sodium chloride crystals, calcium hypochlorite crystals and a mother liquor saturated with calcium hypochlorite and sodium chloride;

f. dividing said slurry into a first slurry [I] mainly containing calcium hypochlorite crystals, sodium chloride crystals and a mother liquor saturated with calcium hypochlorite and sodium chloride, and a second slurry [II] containing calcium hypochlorite crystals and a mother liquor saturated with calcium hypochlorite and sodium chloride;

g. dividing second slurry [II] into calcium hypochlorite crystals and a third phase mother liquor [III] saturated with calcium hypochlorite and sodium chloride;

h. recycling said third phase mother liquor [III] and first slurry [I] to step (a) as an aqueous solution saturated with calcium hypochlorite and sodium chloride containing a small amount of calcium hypochlorite and sodium chloride crystals.

The invention is characterized with adding sodium hydroxide separately in step (a) prior to first chlorination of step (b) and in step (d) prior to second chlorination of step (e), and recycling the third phase mother liquor [III] and first slurry [I].

In the invention concentrations of calcium hypochlorite, sodium hydroxide and sodium chloride in the reaction system are very important, namely the total amount of water in the reaction system is very important. When an excess amount of water is added in the reaction system, the amount of sodium chloride crystal isolated in step (c) becomes small and it becomes difficult to recycle all of the third phase mother liquor [III] and consequently it becomes necessary to remove some part of the mother liquor [III] from the reaction system as a by-product of bleaching liquor. So, if a by-product third phase mother liquor [III] is not desired, addition of water should be strictly controlled.

In carrying out the invention into practice, at step (a), 1 part of sodium hydroxide is added to 17 to 52 parts of an aqueous solution saturated with calcium hypochlorite and sodium chloride and also containing from about 1 to about 2 parts by weight of calcium hypochlorite crystals and from about 1 to about 3 parts by weight of sodium chloride crystals, per one hundred parts by weight of solution. As the starting aqueous solution, a mixture of third phase mother liquor [III] and first slurry [I] is ordinarily employed and further for the first operation of the cyclic production system 17 to 52 parts of an aqueous solution saturated with calcium hypochlorite and sodium chloride may be employed as the starting aqueous solution. Optionally 1 to 2 parts of calcium hypochlorite crystals and sodium chloride crystals may be added in the aqueous solution in order to start the reaction in a steady state. 0.9 to 1.1 part of water may be added into the aqueous solution and preferably water is added with sodium hydroxide in a state of aqueous solution of sodium hydroxide. More preferably 50°Be sodium hydroxide aqueous solution (about 49.5% of sodium hydroxide aqueous solution containing 0 to about 1% of sodium chloride) may be used for adding water and sodium hydroxide at the same time. If more than 1.2 part of water is added, the amount of sodium chloride crystals obtained after chlorination will be reduced and by-production of bleaching liquor is inevitably obtained.

Sodium hydroxide reacts in the aqueous solution as follows:

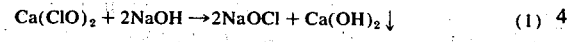

$$Ca(ClO)_2 + 2NaOH \rightarrow 2NaOCl + Ca(OH)_2 \downarrow \quad (1)$$

The calcium hydroxide crystal which precipitates has a diameter of about $1\mu$. When more than the equivalent mole of calcium hypochlorite to sodium oxide in formula (1) exists in the reaction, calcium hydroxide is further reacted as follows:

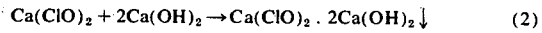

$$Ca(ClO)_2 + 2Ca(OH)_2 \rightarrow Ca(ClO)_2 \cdot 2Ca(OH)_2 \downarrow \quad (2)$$

and produces fine precipitate of dibasic calcium hypochlorite of $Ca(ClO)_2 \cdot 2Ca(OH)_2$. Namely calcium hypochlorite and sodium hydroxide change to NaOCl, $Ca(OH)_2 \cdot 2Ca(OH)_2$ according to formula (1) and (2). Consequently calcium hypochlorite reacts with sodium hydroxide according to formula (3);

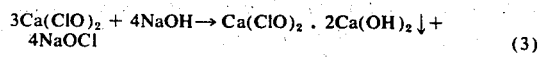

$$3Ca(ClO)_2 + 4NaOH \rightarrow Ca(ClO)_2 \cdot 2Ca(OH)_2 \downarrow + 4NaOCl \quad (3)$$

and sodium hydroxide at a rate of 4 moles to 3 moles of calcium hypochlorite is preferably employed in order to make the calcium hypochlorite crystals disappear. During the addition of sodium hydroxide, the mixture should be cooled and kept at 0° to 20°C preferably at 5° to 10°C in order to avoid decomposition of the calcium hypochlorite and the precipitation of large size crystals of dibasic calcium hypochlorite of $Ca(ClO)_2 \cdot 2(OH)_2$.

At step (b), chlorination can be carried out by introducing chlorine gas into the mixture obtained in step (a) at 5°C to 20°C to the extent of 94.0 to 98.5 percent of the total alkali contents.

The amount of chlorine gas is ordinarily about 0.84 to 0.88 part. After the chlorination, the active chlorine content of aqueous chlorination reaction mixture obtained is at 11.0 to 13.0 percent, calcium hypochlorite is saturated in the aqueous chlorinated mixture and sodium chloride crystal is isolated in the aqueous chlorinated mixture.

At step (c), immediate separation of the sodium chloride crystal from the aqueous chlorinated reaction mixture is carried out to obtain a sodium chloride crystal containing a low active chlorine content, as a very little amount of calcium hypochlorite precipitates in the course of a long time.

For the separation various methods can be employed. For examples, classification by sedimentation, centrifugal separation and filtration may be employed. Centrifugal separation is most preferable because a large amount of sodium chloride crystals and an aqueous chlorinated reaction mixture can be treated in a short time and the sodium chloride crystal obtained has a high quality. Ordinarily the sodium chloride obtained contains 1.5 to 2.1 parts of sodium chloride crystal, less than 10 percent of water and less than 1.5 percent of active chlorine and of a purity higher than 90 percent. The aqueous chlorinated reaction mixture is sent to step (d).

At step (d), into about 18 to 55 parts of the aqueous chlorination reaction mixture, 0.3 to 0.7 part of sodium hydroxide and 1.2 to 1.7 part of calcium hydroxide are fed. The amount of calcium hydroxide corresponds to the total amount of sodium hydroxide used in steps (a) and (d), namely calcium hydroxide is added at a rate of 1 gram mole to 2 gram moles of sodium hydroxide. 0.3 to 0.7 part of water is preferably added with the sodium hydroxide so that the active chlorine content of the reaction mixture may be at 15 to 18 percent after chlorination in step (e). However the total amount of water added in steps (a) and (d) is preferably maintained at 1.3 to 1.7 parts in order to keep the reaction system in a good condition. Active chlorine content of a mixture is defined as twice the weight of chlorine of calcium hypochlorite divided by weight of the total mixture.

At step (e), chlorination is carried out by introducing chlorine gas into the mixture obtained in step (d) to the extent of 95.0 to 98.5 percent of the chlorination rate. During the chlorination reaction the temperature of the reaction mixture should be kept at below 30°C, preferably at about 5°C to 30°C. After the chlorination the active chlorine content of the reaction mixture becomes 15 to 18 percent and at about 16 to 17 percent the calcium hypochlorite is in the best condition for filtration. The active chlorine content of the reaction mixture can be changed by controlling the amounts of sodium hydroxide, water and calcium hydroxide fed in step (d). For example, when 0.5 part of sodium hydroxide, 0.5 part of water and 1.4 part of calcium hydroxide are added in step (d), active chlorine content becomes about 16.4%.

During the chlorination, sodium chloride crystals and calcium hypochlorite crystals precipitate in the reaction mixture. These crystals have a different weight distribution. Ordinarily sodium chloride crystals are in a range of from $5.4 \times 10^{-8}$ to $3.5 \times 10^{-6}$ gram per crystal particle and about 80 percent of the sodium chloride crystals are in a range from $4 \times 10^{-7}$ to $1.5 \times 10^{-6}$ gram per crystal particle on the other hand calcium hypochlorite crystals are in a range of from $3.2 \times 10^{-9}$ to $4.6 \times 10^{-8}$ gram per crystal particle and about 80 percent of calcium hypochlorite crystals are in a range from $8.6 \times 10^{-9}$ to $1.9 \times 10^{-8}$ gram per crystal particle.

Sodium hydroxide added in step (e) reacts according to reaction formula (3) and a part of the calcium hypochlorite precipitates in the form of dibasic calcium hypochlorite. So, the concentration of calcium hypochlorite decreases and dibasic calcium hypochlorite crystal does not grow to large particle by addition of calcium hydroxide. Namely when calcium hydroxide is added without adding sodium hydroxide, dibasic calcium hypochlorite crystal becomes large one (ordinarily 1 to 3mm in diameter) and chlorination becomes difficult and the sodium chloride crystal and the calcium hypochlorite crystals become too small to separate one from the other.

At step (f) the chlorination reaction mixture is separated into a slurry [I] mainly containing calcium hypochlorite crystal, sodium chloride crystal and mother liquor saturated with calcium hypochlorite and sodium chloride, and slurry [II] containing calcium hypochlorite crystals, a small amount of sodium chloride crystals and mother liquor saturated with calcium hypochlorite and sodium chloride. Various means for the separation can be employed.

For example, the separation can preferably be carried out by hydroclycone and slurry [I] is obtained as under flow and slurry [II] is obtained as over flow at a flow rate of 4 to 8 m/sec and 0.10 to 0.14 of flow ratio of $$\left( \frac{\text{volume of under flow}}{\text{volume of over flow}} \right).$$

Ordinarily 2.0 to 4 parts of slurry [I] and 16 to 50 parts of slurry [III] are obtained.

At step (g), slurry [II] obtained in step (f) is separated into calcium hypochlorite crystal and mother liquor [III] saturated with calcium hypochlorite and sodium chloride by known separation method but by centrifugal hydroextractor about 3.6 to 4.8 parts of calcium hypochlorite crystal containing about 30 to 35 percent of water and about 8 to 16 percent of sodium chloride crystal are removed from mother liquor [III]. Dry calcium hypochlorite crystals having more than 60 percent of active chlorine content is obtained by drying the calcium hypochlorite crystals separated from slurry [II]. When the effective chlorine content is too high to meet the standard of a finished product of high test hypochlorite, it can be adjusted to a lower content by controlling flow ratio of separation of slurry [I] and slurry [II] towards 1.0 of the flow ratio in step (f) in order to mix more sodium chloride crystal into slurry [II].

At step (h), mother liquor [III] and slurry [I] are recycled to step (a) as an aqueous solution saturated with calcium hypochlorite and sodium chloride containing a small amount of calcium hypochlorite crystal and sodium chloride crystal. When a bleaching solution is required to be produced as a product, bleaching solution can be taken out of the reaction system by adding an excess amount of water in step (d).

In the process, pure calcium hypochlorite crystal is only taken out of the slurry at step (e) and calcium hypochlorite crystal contaminated with sodium chloride crystal is left in slurry [I] and some portion of the calcium hypochlorite crystal is recycled. Thus a drop in the yield of calcium hypochlorite does not occur by the recycling. As for sodium chloride, pure sodium chloride crystals are only taken out of the chlorinated reaction mixture at step (c), the sodium chloride crystals are large enough to be easily filtrated and have sufficient purity to be hydrolysis for the production of sodium chloride. On the other hand sodium chloride crystal precipitated in the second chlorination at step (e) is left in slurry [I] and is recycled.

The reason why the sodium chloride crystal grows in the process is believed to be because the sodium chloride crystal precipitated in second chlorination is recycled and the crystal grows in the first chlorination in step (b), and the reason why the pure calcium hypochlorite crystal can be separated in step (g) is that addition of sodium hydroxide helps sodium chloride crystals to grow.

An important merit of the process is that sodium hypochlorite crystals having high purity can be produced without having a bleaching liquid by-product and the sodium chloride recovered has sufficient quality for hydrolysis. In order to achieve this merit, the total amount of water which is taken out of the reaction system with calcium hypochlorite crystals and sodium chloride crystals should balance the total amount of water which is added in the reaction system and water is most preferably added with sodium hydroxide as about a 49% sodium hydroxide aqueous solution.

All quantities described in this specification and the appended claimed as "part(s)" or "%" refer to "parts by weight" or "% by weight" unless expressly stated otherwise.

EXAMPLE 1

Step (a); 368 kg of an aqueous solution (mother liquor [III]) comprising 69.5% of $H_2O$, 9.6% of $Ca(ClO)_2$ and 19.9% of NaCl, and 48 kg of slurry (slurry [I]) comprising 47.5% of $H_2O$, 15.0% of $Ca(ClO)_2$ and 36.6% of NaCl (5.6 kg calcium hypochlorite and 11.4 kg sodium chloride being in the crystal phase in slurry I) were mixed and cooled at 15°C and further 30 kg of 49.5% of aqueous sodium hydroxide was fed into the mixture. Step (b); Then chlorine gas was introduced into the mixture at a rate of 12.9 kg/hr at 15°C to the extent that chlorination took place to 98.0 percent of the total alkali. Step (c); Very soon after the chlorination sodium chloride crystal was separated by the centrifugal separator and 28 kg of sodium chloride crystal containing 92.5% of NaCl, 6.4% of $H_2O$ and 0.8% of active chlorine and aqueous chlorinated reaction mixture containing 9.8% of $Ca(CO)_2$, 3.1% of NaClO, 17.5% of NaCl, 69.1% of $H_2O$ and 12.7% of active chlorine were obtained. Step (d); 15 kg of 49.5% of aqueous sodium hydroxide was fed into the aqueous chlorinated reaction mixture remaining at the separation of sodium chloride crystals and mixed at 15°C for 30 minutes. Then 20.5 kg of fine powder of calcium hydroxide of 97 percent purity was fed in and mixed well at about 15° to 17°C. Thus alkali suspension was prepared. Step (e); 24.9 kg of chlorine gas was introduced into the alkali suspension to chlorinate 97.0 percent of the total alkali for 2 hours at 20°C. After the chlorination the content of the calcium hypochlorite was 16.2 percent, concentration of the sodium chloride was 19.7 percent in the reaction mixture of slurry and the average weight of one particle of calcium hypochlorite crystal was $2.1 \times 10^{-8}$ grams per particle and the average weight of one particle of sodium chloride crystal was $4.2 \times 10^{-7}$ grams per particle. Step (f); The slurry was introduced into the hydrocyclone having an upper diameter of 100 mm and a lower diameter of 11.2mm at a flow rate of 6.5 m/sec. 48 kg of under flow (slurry [I]) was obtained and 434 kg of over flow slurry [II] was obtained. Step (g); Slurry [II] was then centrifuged and 63 kg of wet calcium hypochlorite crystal and 360 kg of mother liquor [III] saturated with calcium hypochlorite and sodium chloride were separately obtained. The wet calcium hypochlorite crystal comprised 56.8% of $Ca(ClO)_2$, 8.0% of NaCl, 2.7% of total alkali and 31.5% of $H_2O$ and after drying, finished product of calcium hypochlorite had 77.5% of active chlorine. Step (h); The mother liquor [III] and slurry [I] were recycled to step (a).

EXAMPLE 2

Step (a); 450 kg of an aqueous solution (mother liquor [III]) comprising 69.8% of $H_2O$, 9.5% of $Ca(ClO)_2$ and 20.0% of NaCl and 58 kg of slurry (slurry [I]) comprising 48.5% of $H_2O$, 14.8% of $Ca(ClO)_2$ and 35.8% of NaCl (6.5 kg calcium hypochlorite and 13.1 kg sodium chloride being in the crystal phase in slurry [I]) were mixed and cooled at 5°C and further 30 kg of 49.5% of aqueous sodium hydroxide was fed in the mixture. Step (b); Then chlorination is continously carried out at a rate of 300 kg/hr in a cylindrical reactor with a cooling jacket having 2 meters in length and 0.125 meters in diameter by introducing chlorine gas into the mixture at a rate of 7.1 kg/hr at 15°C to the extent that chlorination took place to 98.0% of the total alkali. Step (c); A chlorination mixture obtained in the first chlorination step was introduced into a continuous centrifugal separator and 32 kg of sodium chloride crystal containing 90.7% of NaCl, 7.7% of $H_2O$ and 1.1% of active chlorine, and aqueous chlorinated reaction mixture containing 9.8% of $Ca(ClO)_2$, 2.5% of NaClO, 17.8% of NaCl, 69.3% of $H_2O$ and 12.1% of active chlorine were obtained. Step (d); All of the aqueous chlorinated reaction mixture separated was mixed with 20.5 kg of 49.5% of aqueous sodium chloride at 15°C and then 23 kg of calcium hydroxide having 97 percent purity was added and stirred well. Thus alkali suspension was further ground through a wet type powdering machine in order to grind small particle of the suspensoid. Step (e); 29.4 kg of chlorine gas was introduced into the alkali suspension for 2 hours to chlorinate 97 percent of the total alkali at 24°C. After the chlorination the concentration of the calcium chlorite was 15.6 percent, a concentration of sodium chloride was 19.9 percent in the reaction mixture of slurry and the average weight of one particle of calcium hypochlorite crystal was $1.1 \times 10^{-8}$ gram per particle and the average weight of one particle of sodium chloride crystal was $2.4 \times 10^{-7}$ gram per particle. Step (f); The slurry was introduced into a hydrocyclone having an upper diameter of 100mm and a lower diameter of 12.0 mm at a flow rate of 7.4 m/sec. 58 kg of under flow (slurry [I]) was obtained and 523 kg of over flow (slurry [II]) was obtained. Step (g); Slurry [II] was then centrifuged and 72 kg of wet calcium hypochlorite and 440 kg of mother liquor [III] saturated with calcium hypochlorite and sodium chloride were separately obtained. The wet calcium hypochlorite crystal comprised 54.5% of $Ca(ClO)_2$, 8.4% of NaCl, 2.8% of total alkali and 33.5% of H O and after drying, finished product of calcium hypochlorite had 73.8 percent of active chlorine. Step (h); The mother liquor [III] and slurry [I] were recycled to step (a).

EXAMPLE 3

Step (a); 350 kg of aqueous solution (mother liquor [III]) comprising 69.5% of $H_2O$, 9.6 of $Ca(ClO)_2$ and 19.9% of NaCl, and 50 kg of slurry (slurry [I]) comprising 49.3% of $H_2O$, 15.2% of $Ca(ClO)_2$ and 34.7% of NaCl (5.8 kg calcium hypochlorite and 10.7 kg sodium chloride being in the crystal phase in slurry [I]) were mixed and cooled at 15°C and further 30 kg of 40.0% of aqueous sodium hydroxide were fed into the mixture. Step (b); Then chlorine gas was introduced into the mixture at a rate of 10.4 kg/hr at 10°C to the extent that chlorination took place to 97.7 percent of the total alkali. Step (c); Very soon after the chlorination sodium chloride crystals were separated by a centrifugal separator and 24 kg of sodium chloride crystals containing 93.0% of NaCl, 5.5% of $H_2O$ and 0.7% of active chlorine and an aqueous chlorinated reaction mixture containing 9.9% of $Ca(ClO)_2$, 2.6% of NaClO, 17.6% of NaCl, 68.9% of $H_2O$ and 12.3% of active chlorine were obtained. Step (d); 20.5 kg of 40% of aqueous sodium hydroxide were fed into the aqueous chlorinated reaction mixture remaining after the separation of sodium chloride crystals and mixed at 10°C and further 17.6 kg of fine powder of calcium hydroxide being of 97.0 percent purity was fed in and mixed well. Thus alkali suspension was prepared. Step (e); 22.9 kg of chlorine gas was introduced into the alkali suspension to chlorinate 97.0% of the total alkali for 1.5 hours at 20°C ± 2°C. After the chlorination the contents of the calcium hypochlorite were 15.5 percent, the concentration of sodium chloride was 19.6 percent in the reaction mixture of slurry and the average weight of one particle of calcium hypochlorite crystal was $2.5 \times 10^{-8}$ grams per particle and the average weight of one particle of sodium chloride crystal was $5.4 \times 10^{-7}$ grams per particle. Step (f); The slurry was introduced into a hydrocyclone having an upper diameter of 100 mm and a lower diameter of 11.2 mm at a flow rate of 6.0 m/sec. 50 kg of under flow (slurry [I]) was obtained and 418 kg of over flow (slurry [II]) was obtained. Step (g); Slurry [II] was then centrifuged and 53 kg of wet calcium hypochlorite crystal and 362 kg of mother liquor [III] saturated with calcium hypochlorite and sodium chlorite were separately obtained. The wet calcium hypochlorite crystal comprised 56.0% of $Ca(ClO)_2$, 6.8% of NaCl, 2.9% of total alkali and 34.0% of $H_2O$ and after drying, the finished product of calcium hypochlorite had 77.0% of active chlorine. Step (h); 12 kg of mother liquor [III] was taken out of the reaction system as a bleaching liquor and all of 350 kg of mother liquor remaining and slurry [I] were recycled to step (a).

we claim:

1. A process for production of calcium hypochlorite comprising the steps of:
    a. adding sodium hydroxide into an aqueous solution saturated with calcium hypochlorite and sodium chloride containing a small amount of calcium hypochlorite crystals and sodium chloride crystals;

b. chlorinating the mixture obtained in step (a) with chlorine gas to produce sodium chloride crystals and an aqueous chlorinated reaction mixture;

c. isolating the formed sodium chloride crystals from said aqueous chlorinated reaction mixture;

d. feeding calcium hydroxide and sodium hydroxide into the aqueous chlorinated reaction mixture remaining after separation of said crystals therefrom;

e. chlorinating the mixture obtained in step (d) containing calcium hydroxide and sodium hydroxide with chlorine gas to produce a slurry containing mainly sodium chloride crystals, calcium hypochlorite crystals and a mother liquor saturated with calcium hypochlorite and sodium chloride;

f. cyclone dividing said slurry into a first slurry [I] mainly containing calcium hypochlorite crystals, sodium chloride crystals and mother liquor saturated with calcium hypochlorite and sodium chloride, and a second slurry [II] containing calcium hypochlorite crystals with a small amount of sodium chloride crystals and mother liquor saturated with calcium hypochlorite and sodium chloride;

g. dividing said second slurry [II] into calcium hypochlorite crystals with a small amount of sodium chloride crystals and a third phase mother liquor [III] saturated with calcium hypochlorite and sodium chloride;

h. recycling said third phase mother liquor [III] and said first slurry [I] to step (a) as an aqueous solution saturated with calcium hypochlorite and sodium chloride containing a small amount of calcium hypochlorite and sodium chloride crystals.

2. A process according to claim 1, wherein sodium hydroxide is added with water at steps (a) and (d).

3. A process according to claim 1, wherein sodium hydroxide is added as an aqueous sodium hydroxide at steps (a) and (d).

4. A process according to claim 3, wherein the sodium hydroxide is added as a 50 Be; sodium hydroxide solution.

5. A process for production of calcium hypochlorite comprising the steps of:

a. adding 1 part of sodium hydroxide into 17 to 57 parts of an aqueous solution saturated with calcium hypochlorite and sodium chloride containing 1 to 2 parts of calcium hypochlorite crystals and sodium chloride crystals;

b. chlorinating the mixture obtained in step (a) with chlorine gas to produce sodium chloride crystals and an aqueous chlorinated reaction mixture;

c. isolating 1.5 to 2.1 parts of wet sodium chloride crystals from said aqueous chlorinated reaction mixture;

d. feeding 1.2 to 1.7 parts of calcium hydroxide and 0.3 to 0.7 parts of sodium hydroxide into the aqueous chlorinated reaction mixture remaining after separation of said crystals therefrom;

e. chlorinating the mixture obtained in step (d) containing calcium hydroxide and sodium hydroxide with chlorine gas to produce a slurry containing mainly sodium chloride crystals, calcium hypochlorite crystals and a mother liquor saturated with calcium hypochlorite and sodium chloride;

f. cyclone dividing said slurry into 2 to 4 parts of a first slurry [I] mainly containing calcium hypochlorite crystals, sodium chloride crystals and mother liquor saturated with calcium hypochlorite and sodium chloride, and 16 to 50 parts of a second slurry [II] containing calcium hypochlorite and sodium chloride;

g. dividing said second slurry [II] into 3.6 to 4.8 parts of wet calcium hypochlorite crystals containing a small amount of sodium chloride crystal, and third phase mother liquor [III] saturated with calcium hypochlorite and sodium chloride;

h. recycling said third phase mother liquor [III] and said slurry [I] to step (a) as an aqueous solution with calcium hypochlorite and sodium chloride containing a small amount of calcium hypochlorite and sodium chloride crystal.

6. A process according to claim 5, wherein sodium hydroxide is added with water at steps (a) and (d).

7. A process according to claim 6, wherein total amount of water added to step (a) and (d) is 1.3 to 1.7 part.

8. A process according to claim 5, wherein sodium hydroxide is added as a 50 Be sodium hydroxide solution.

9. A process according to claim 5, wherein the active chlorine content of the slurry is 15 to 18 percent in step (e).

10. In the process of producing calcium hypochlorite wherein an aqueous solution saturated with calcium hypochlorite and sodium chloride is chlorinated to produce sodium chloride crystals and an aqueous chlorinated mixture, the formed sodium chloride crystals being then separated from the mixture, the improvement in said process comprising the steps of:

a. using an aqueous solution obtained from a later reaction step which contains about 1 to about 2 parts by weight of the solution of calcium hypochlorite crystals and from about 1 to about 3 parts by weight of the solution of sodium chloride crystals with sodium hydroxide being added to said solution;

b. chlorinating said solution having the added sodium hydroxide to produce sodium chloride crystals and an aqueous chlorinated reaction mixture, the formed sodium crystals being then separated from said mixture leaving a chlorinated liquid phase residue;

c. feeding calcium hydroxide and sodium hydroxide into said residue;

d. chlorinating said residue to produce a slurry;

e. cyclone separating said slurry into a first slurry [I] having mainly calcium hypochlorite crystals, sodium chloride crystals and mother liquor saturated with calcium hypochlorite and sodium hypochlorite, and a second slurry [II] containing calcium hypochlorite crystals with a small amount of sodium chloride crystals and mother liquor saturated with calcium hypochlorite and sodium chloride;

f. removing most of said crystals in said second slurry [II] to form a third phase mother liquor [III] saturated with calcium hypochlorite and sodium chloride; and g. recycling said third phase mother liquor [III] and said first slurry [I] to the first process step as the aqueous solution used herein.

* * * * *

UNITED STATES PATENT OFFICE
CERTIFICATE OF CORRECTION

PATENT NO. : 3,950,499
DATED : April 13, 1976
INVENTOR(S) : Noboru Miyashin et al It is certified that error appears in the above-identified patent and that said Letters Patent are hereby corrected as shown below:

In the Abstract, column 2, fifth line from the bottom, cancel "is" and insert --are--;

Column 1, line 66, cancel "is" and insert --are--;

Column 3, line 49, cancel "sodium oxide" and insert --sodium hydroxide--;

Column 4, line 3, cancel "$Ca(ClO)_2.2(OH)_2$" and insert --$Ca(ClO)_2.2Ca(OH)_2$--;

Column 5, line 11, cancel "step(e)" and insert --step(d)--;

Column 5, line 44, cancel "slurry[III]" and insert --slurry[II];

Column 6, line 4, cancel "step(e)" and insert --step(g)--;

Column 6, line 13, cancel "hydrolysis" and insert --electrolyzed--;

Column 6, line 14, cancel "chloride" and insert --hydroxide--;

Column 6, line 25, cancel "sodium" and insert --calcium--;

UNITED STATES PATENT AND TRADEMARK OFFICE
CERTIFICATE OF CORRECTION

PATENT NO. : 3,950,499
DATED : April 13, 1976
INVENTOR(S) : Noboru Miyashin et al It is certified that error appears in the above-identified patent and that said Letters Patent are hereby corrected as shown below:

Column 6, line 29, cancel "hydrolysis" and insert --electrolysis--;

Column 7, line 49, cancel "chloride" and insert --hydroxide--;

Column 8, line 5, cancel "H O" and insert --$H_2O$--;

Column 9, line 43, cancel "17 to 57" and insert --17 to 52--;

Column 10, line 44, cancel "sodium crystals" and insert --sodium chloride crystals--.

Signed and Sealed this

First Day of February 1977

[SEAL]

Attest:

RUTH C. MASON
Attesting Officer

C. MARSHALL DANN
Commissioner of Patents and Trademarks